(12) United States Patent
Charbit et al.

(10) Patent No.: US 11,552,700 B2
(45) Date of Patent: Jan. 10, 2023

(54) UPLINK TRANSMISSION TIMING FOR NON-TERRESTRIAL NETWORKS

(71) Applicant: MediaTek Inc., Hsinchu (TW)

(72) Inventors: Gilles Charbit, Cambridge (GB); Shiang-Jiun Lin, Hsinchu (TW)

(73) Assignee: MediaTek Inc.

( * ) Notice: Subject to any disclaimer, the term of this patent is extended or adjusted under 35 U.S.C. 154(b) by 79 days.

(21) Appl. No.: 16/802,507

(22) Filed: Feb. 26, 2020

(65) Prior Publication Data

US 2020/0295824 A1    Sep. 17, 2020

Related U.S. Application Data

(60) Provisional application No. 62/816,284, filed on Mar. 11, 2019.

(51) Int. Cl.
| | | |
|---|---|---|
| H04B 7/185 | (2006.01) | |
| H04L 5/00 | (2006.01) | |
| H04W 72/14 | (2009.01) | |
| H04L 1/18 | (2006.01) | |
| H04W 72/04 | (2009.01) | |

(52) U.S. Cl.
CPC ..... *H04B 7/18532* (2013.01); *H04B 7/18526* (2013.01); *H04L 1/1819* (2013.01); *H04L 5/0055* (2013.01); *H04W 72/042* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2017/0041916 A1 | 2/2017 | Soret et al. | |
| 2019/0254061 A1* | 8/2019 | Manolakos | H04L 5/0048 |
| 2019/0342845 A1* | 11/2019 | Laselva | H04L 1/1812 |
| 2020/0275430 A1* | 8/2020 | Salem | H04W 72/042 |
| 2021/0014905 A1* | 1/2021 | Wu | H04W 52/0229 |

FOREIGN PATENT DOCUMENTS

CN    107852686 A    3/2018

OTHER PUBLICATIONS

Ericsson, On UL transmission timing for NTN, 3GPP TSG-RAN WG1 Meeting #96, R1-1902905, Athens, Greece, Feb. 25-Mar. 1, 2019 (Year: 2019).*
Taiwan Intellectual Property Office, Office Action for Taiwan Patent Application No. 109106703, dated Mar. 31, 2021.
China National Intellectual Property Administration, International Search Report and Written Opinion for PCT/CN2020/077420, dated May 27, 2020.
Nomor Research Gmbh et al., Consideration on MAC Timers and on RTD Compensation Offset in Non-Terrestrial Networks (NTN), 3GPP TSG-RAN WG2 Meeting # 104, R2-1818511, Spokane, USA, Nov. 12-16, 2018.
Ericsson, On UL transmission timing for NTN, 3GPP TSG-RAN WG1 Meeting #96, R1-1902905, Athens, Greece, Feb. 25-Mar. 1, 2019.

* cited by examiner

*Primary Examiner* — Saad Khawar
(74) *Attorney, Agent, or Firm* — Han IP PLLC; Andy M. Han

(57) ABSTRACT

Various examples and schemes pertaining to uplink (UL) transmission timing for non-terrestrial networking (NTN) are described. An apparatus receives, from a network, downlink control information (DCI) indicating an NTN offset for a scheduling delay. Accordingly, the apparatus performs one or more UL transmissions to a satellite with the scheduling delay which accounts for the NTN offset.

12 Claims, 6 Drawing Sheets

UPLINK TRANSMISSION TIMING FOR NON-TERRESTRIAL NETWORKS

CROSS REFERENCE TO RELATED PATENT APPLICATION(S)

The present disclosure is part of a non-provisional application claiming the priority benefit of U.S. Patent Application No. 62/816,284, filed on 11 Mar. 2019, the content of which being incorporated by reference in its entirety.

TECHNICAL FIELD

The present disclosure is generally related to wireless communications and networking and, more particularly, to uplink (UL) transmission timing for non-terrestrial networking (NTN).

BACKGROUND

Unless otherwise indicated herein, approaches described in this section are not prior art to the claims listed below and are not admitted as prior art by inclusion in this section.

In terms of addressing the issues of coverage and difficult use-cases associated with land-based communication and networking infrastructure, satellites can be a viable means to the solution. The $3^{rd}$-Generation Partnership Project (3GPP) specification for $5^{th}$ Generation (5G) mobile communications considers non-terrestrial networks, including satellite segments, a recognized part of 5G connectivity infrastructure. However, there remain challenges to be addressed to ensure that satellite systems are integrated as an intrinsic part of the 5G ecosystem. For instance, the round-trip time (RTT) for a satellite is approximately 28 ms for a low-earth-orbit (LEO) satellite at 600 km above sea level and can be up to 544 ms for a geostationary (GEO) satellite at 35,786 km above sea level. Accordingly, timing advance needs to compensate for satellite RTT before a user equipment (UE) can transmit on an UL channel. Additionally, scheduling delay due to large satellite RTT also needs to be minimized to avoid negative impact on data rates.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure aims to provide schemes, solutions, concepts, designs, methods and systems to address aforementioned issues associated with NTN. Specifically, various proposed schemes in accordance with the present disclosure aim to provide solutions pertaining to UL transmission timing for NTN, for example, in the context of satellite communications as part of 5G mobile communications. It is believed that, by implementing various proposed schemes in accordance with the present disclosure, scheduling delay due to large satellite RTT may be minimized to avoid negative impact on data rates.

In one aspect, a method may involve a processor of an apparatus receiving, from a network, downlink control information (DCI) indicating an NTN offset for a scheduling delay. The method may also involve the processor performing an UL transmission to a satellite with the scheduling delay which accounts for the NTN offset.

In one aspect, a method may involve a processor of a network node of a network adjusting an NTN offset for a scheduling delay. The method may also involve the processor transmitting, to a UE, DCI indicating the NTN offset such that the UE may transmit one or more UL transmissions to a satellite with the scheduling delay which accounts for the NTN offset.

In yet another aspect, an apparatus may include a communication device and a processor coupled to the communication device. The communication device may be configured to wirelessly communicate with a network and a satellite. The processor may receive, via the communication device, from a network DCI indicating an NTN offset for a scheduling delay. The processor may also perform, via the communication device, an UL transmission to a satellite with the scheduling delay which accounts for the NTN offset.

It is noteworthy that, although description provided herein may be in the context of certain radio access technologies, networks and network topologies such as NTN, the proposed concepts, schemes and any variation(s)/derivative(s) thereof may be implemented in, for and by other types of radio access technologies, networks and network topologies such as, for example and without limitation, $5^{th}$ Generation (5G), New Radio (NR), Long-Term Evolution (LTE), LTE-Advanced, LTE-Advanced Pro, Internet of Things (IoT), Industrial Internet of Things (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UL transmission timing for NTN. According to the present disclosure, a number of possible solutions may be implemented separately or jointly. That is, although these possible solutions may be described below separately, two or more of these possible solutions may be implemented in one combination or another.

With respect to delay, a differential delay is the difference between a total propagation delay and a common delay in a given satellite beam. Solutions for compensation of the common delay have been discussed in the pertinent 3GPP working group. This is typically done in legacy satellite system and needs to be done in NR or NB-IoT to enable satellite communications. For example, the common delay can be broadcasted in system information (SI), or proprietary Global Navigation Satellite System (GNSS)-based compensation at UE can be implemented. Legacy NR random access channel (RACH) preamble and TA mechanisms are sufficient to compensate residual delay in NTN to achieve UL timing synchronization in NTN. However, a scheduling solution that minimizes scheduling delay due to large satellite RTT is still needed to avoid negative impact on data rates.

Figure 1:
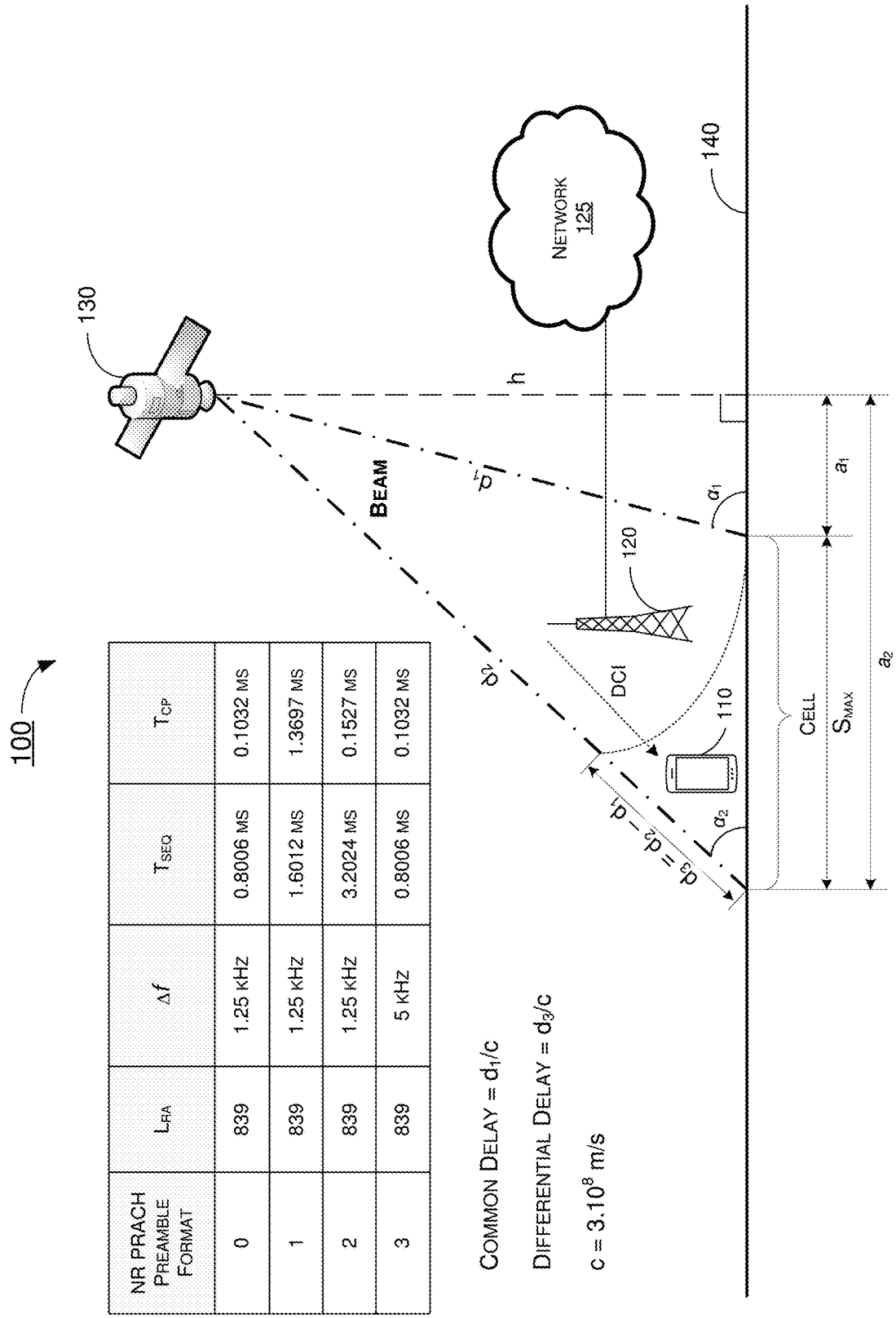
FIG. 1 is a diagram of an example satellite communication environment in which various solutions and schemes in accordance with the present disclosure may be implemented.

FIG. 1 illustrates an example satellite communication environment 100 in which various solutions and schemes in accordance with the present disclosure may be implemented. Referring to FIG. 1, satellite communication environment 100 may involve a UE 110, a network node 120 (e.g., a base station such as a gNB or eNB) of a network 125 (e.g., 5G mobile network), and a satellite 130 orbiting around the earth 140. Assuming the common delay $d_1/c$ is pre-compensated, TA would need to compensate for the differential delay $d_3/c$, where c denotes the speed of light or $3 \cdot 10^8$ m/s. One existing approach is to re-use legacy NR RACH preamble for NTN at LEO of 600 km at bandwidth FR1. Under such solution, satellite 130 would center its detection window around an expected RACH preamble reception timing. If d1 common delay is pre-compensated, NR physical random access channel (PRACH) can be re-used if $d_2/c$ is less than 200 km with a specified TA range. With prior knowledge of d1 common delay in a beam at a UE, PRACH detection window at network node 120 may be approximately twice the differential delay $d_2/c$.

In the example shown in FIG. 1, assuming satellite 130 is at LEO of 600 km and moving at a speed of 100 km relative to the earth 140, with beam spot diameter of 1.25 kHz subc and RTT of 28 ms, with NR PRACH preamble Format 1 the maximum cell radius may be about 205 km ($=3 \times 10^8 * 1.3697$ ms/2) which is greater than $d_3$ (~8.4 km). With NR PRACH preamble Format 3 the maximum cell radius may be about 15.5 km ($=3 \times 10^8 * 0.1032$ ms/2) which is greater than $d_3$ (~8.4 km).

With respect to initial TA adjustment, one existing approach is to re-use legacy TA adjustment for NTN at LEO of 600 km at bandwidth FR1 with a subcarrier spacing (SCS) of 15 kHz. For example, network node 120 may estimate the initial TA from PRACH preamble and then indicate tracking area code (TAC) in a random access response (RAR). The TAC may indicate the maximum index value of TA=3846. TA granularity subcarrier spacing $2^\mu * 15$ kHz is $N_{TA}=16*64/2*T_c$. Here is, $T_c$ is $0.509*10^{-6}$ ms (=1/($\Delta f_{max} * N_f$)) where $\Delta f_{max}=400$ kHz and $N_f=4096$. For SCS of 15 kHz, up to $N_{TA}=2$ ms timing advance may be indicated. TA range allows up to 300 km of cell radius (as 300 km/$3*10^8*2=2$ ms) and scales down by $2^\mu$ with the increase of SCS. The maximum cell size in NR may be given by cyclic prefix (CP) of PRACH preamble Format 1 (e.g., with Format 1, subc=1.25 kHz, $T_{CP}=1.3697$ ms allows maximum cell radius of approximately 205 km).

With respect to closed-loop TA adjustment, one existing approach is to re-use legacy closed-loop TA adjustment for NTN at LEO of 600 km at bandwidth FR1 with a SCS of 15 kHz. For example, TA adjustment of $N_{TA}$ may be indicated in TAC with index value of TA=0, 1, 2, ..., 63. A maximum TA adjustment of $32*16*64*T_c/2^\mu=32768*T_c=512*T_s=16.67$ us for $\mu=0$ (SCS=15 kHz). Upon receiving a TAC in time slot n, UE 110 may adjust the timing from the beginning of slot n+6. TA accuracy may be $\pm 256 T_c=\pm 4 T_s=0.13$ us for SCS=15 kHz. Time drift impact on closed-loop TA adjustment for NTN at LEO=600 km at FR1 with SCS=15 kHz may be that time drift per RTT=28 ms is approximately 0.71 us (=22 $T_s$), given a satellite speed of 7.6 km/x, with $T_s=1/30720000 \sim 32.55$ ns, $c=3*10^8$ m/s. This is greater than specified transmission timing error ($\pm Te=\pm 0.39$ us=12 $T_s$) but still within range of specified maximum TA adjustment of 16.67 us (=512 $T_s$). However, this would not satisfy performance requirements under new 3GPP specification for NR.

With respect to the maximum number of hybrid automatic repeat request (HARQ) processes in NTN, RTT satellite propagation delay reduces the maximum data rates (assuming maximum sixteen HARQ processes). The reduction in data rates can be possible with increased complexity and/or soft buffer size in case the maximum number of HARQ processes is increased, which may not be desirable (e.g., $N_{HARQ-min} \sim 25 > 16$ at RTT=$T_{HARQ}=25$ ms with LEO=600 km with SCS=15 kHz and $T_{slot}=1$ ms). It is preferred that the maximum number of HARQ processes in NR or NB-IoT not be increased to avoid complexity (and, hence, negative impact on performance).

In view of the above, it can be seen that there are at least two issues associated with existing approaches with respect to UL transmission timing. A first issue (Issue 1) issue is related to UL HARQ acknowledgement (ACK) and negative acknowledgement (NACK) on NR physical uplink control channel (PUCCH) in NR-NTN. For example, following data in a physical downlink shared channel (PDSCH) in slot n, UL HARQ-ACK transmitted by UE 110 in PUCCH in slot n+k may be received by network node 120 with multiple tens or hundreds of milliseconds one-way delay. Thus, a solution for new HARQ-ACK transmission timing of PUCCH is needed. A second issue (Issue 2) is related to UL grant for data on NR physical uplink shared channel (PUSCH) in NR-NTN. For example, following UL grant in downlink control information (DCI) format 0_0 or 0_1 in slot n, due to propagation delay on access link UE-satellite and feeder link satellite-gateway, UE 110 needs to advance its transmission timing by multiple of tens or hundreds of milliseconds before it receives UL grant in DCI. Thus, a solution for new transmission timing of data on PUSCH is needed.

Figure 2:
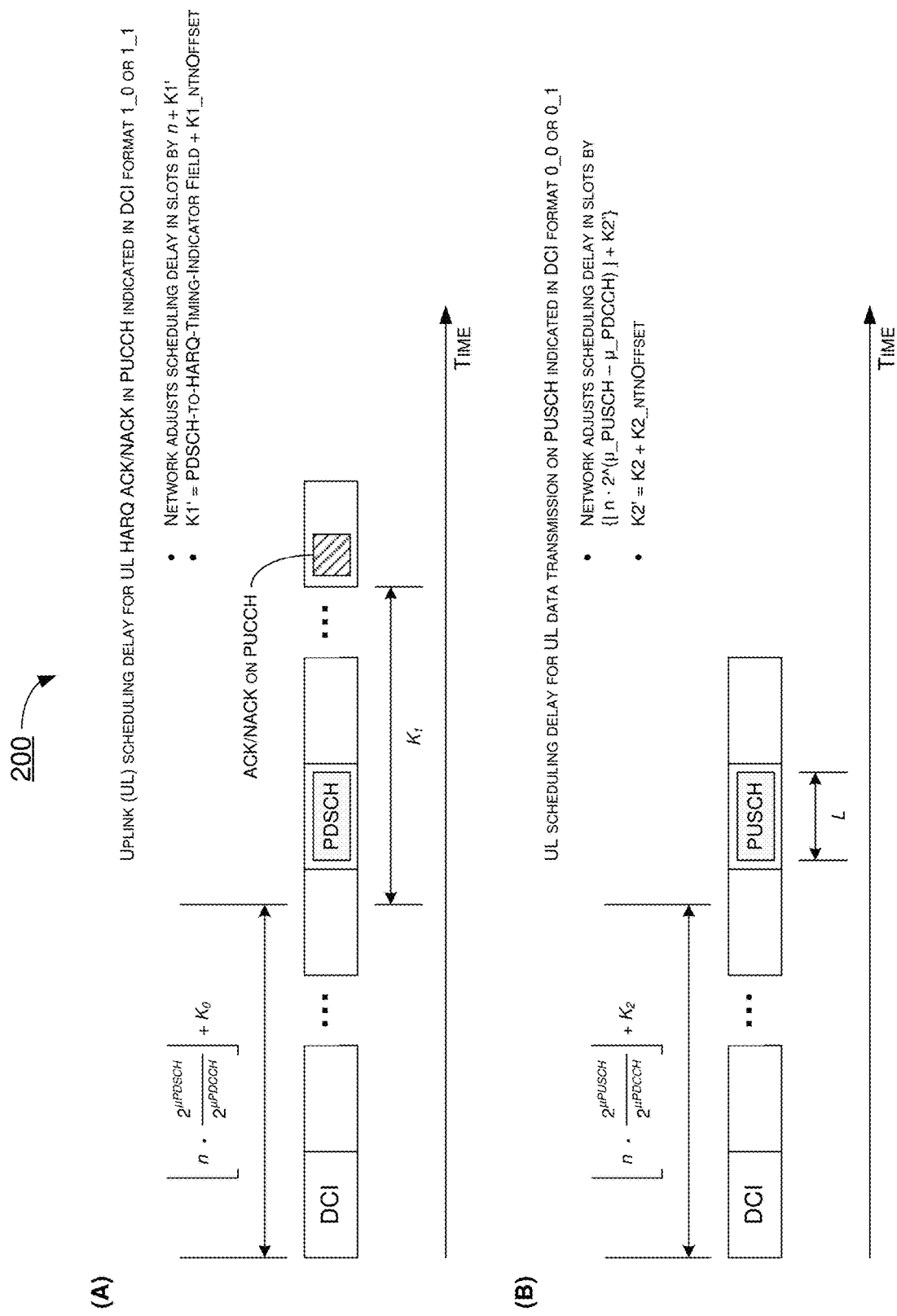
FIG. 2 is a diagram of an example scenario in accordance with the present disclosure.

FIG. 2 illustrates an example scenario 200 in accordance with a first proposed scheme of the present disclosure. Under the first proposed scheme, NTN scheduling offset indication in a system information block (SIB) may be added in downlink (DL) assignment and UL grant indicated via DCI. Referring to part (A) of FIG. 2, under the first proposed scheme and to address aforementioned Issue 1, UL scheduling delay for UL HARQ ACK and NACK in PUCCH may be indicated in DCI format 1_0 or 1_1. For instance, network node 120 may adjust scheduling delay in slots by n+K1', where K1'=PDSCH-to-HARQ-timing-indicator field+K1_ntnOffset. Referring to part (B) of FIG. 2, under the first proposed scheme and to address aforementioned Issue 2, UL scheduling delay for UL data transmission on PUSCH may be indicated in DCI format 0_0 or 0_1. For instance, network node 120 may adjust scheduling delay in slots by $\{\lfloor n\cdot(\mu\_PUSCH-\mu\_PDCCH)\rfloor+K2'\}$, where K2'=K2+K2_ntnOffset. The parameter $\mu\_PUSCH$ may be based on a numerology of PUSCH, and the parameter of $\mu\_PDCCH$ may be based on a numerology of a physical downlink control channel (PDCCH). For instance, $\mu\_PUSCH$ may be based on the numerology of PUSCH as specified in the 3GPP Technical Specification (TS) 38.211, TS 38.213 or TS 38.300 and/or any other version in which the numerology is specified (e.g., in Table 4.2-1, Table 4.2.2-1, Table 4.3.2-1, Table 4.4.2-1 and/or Table 5.1-1), and $\mu\_PDCCH$ may be based on the numerology of PDCCH as specified in the 3GPP TS 38.211, TS 38.213 or TS 38.300 and/or any other version in which the numerology is specified (e.g., in Table 4.2-1, Table 4.2.2-1, Table 4.3.2-1, Table 4.4.2-1 and/or Table 5.1-1). Under the first proposed scheme, K1 may be indicated by the PDSCH-to-HARQ-timing-indicator field in DCI (if present) or by a higher layer parameter dl-DataToUL-ACK. Under the first proposed scheme, since K2 is related to or otherwise calculated using $\mu\_PUSCH$ and $\mu\_PDCCH$, K2 may be said to be based on the numerology of PUSCH (and the numerology of PDCCH).

Compared to existing approaches, the first proposed scheme may have a larger RTT with K1'>K1 and K2'>K2. Larger scheduling delay may lead to reduced maximum data rates assuming there are a maximum number of sixteen HARQ processes. There could be increased complexity and/or soft buffer size in an event that the maximum number of HARQ processes is increased to maintain the maximum data rates (e.g., $N_{HARQ-min}$~25>16 with RTT=25 ms, LEO=600 km, SCS=15 kHz and $T_{slot}$=1 ms).

Figure 3:
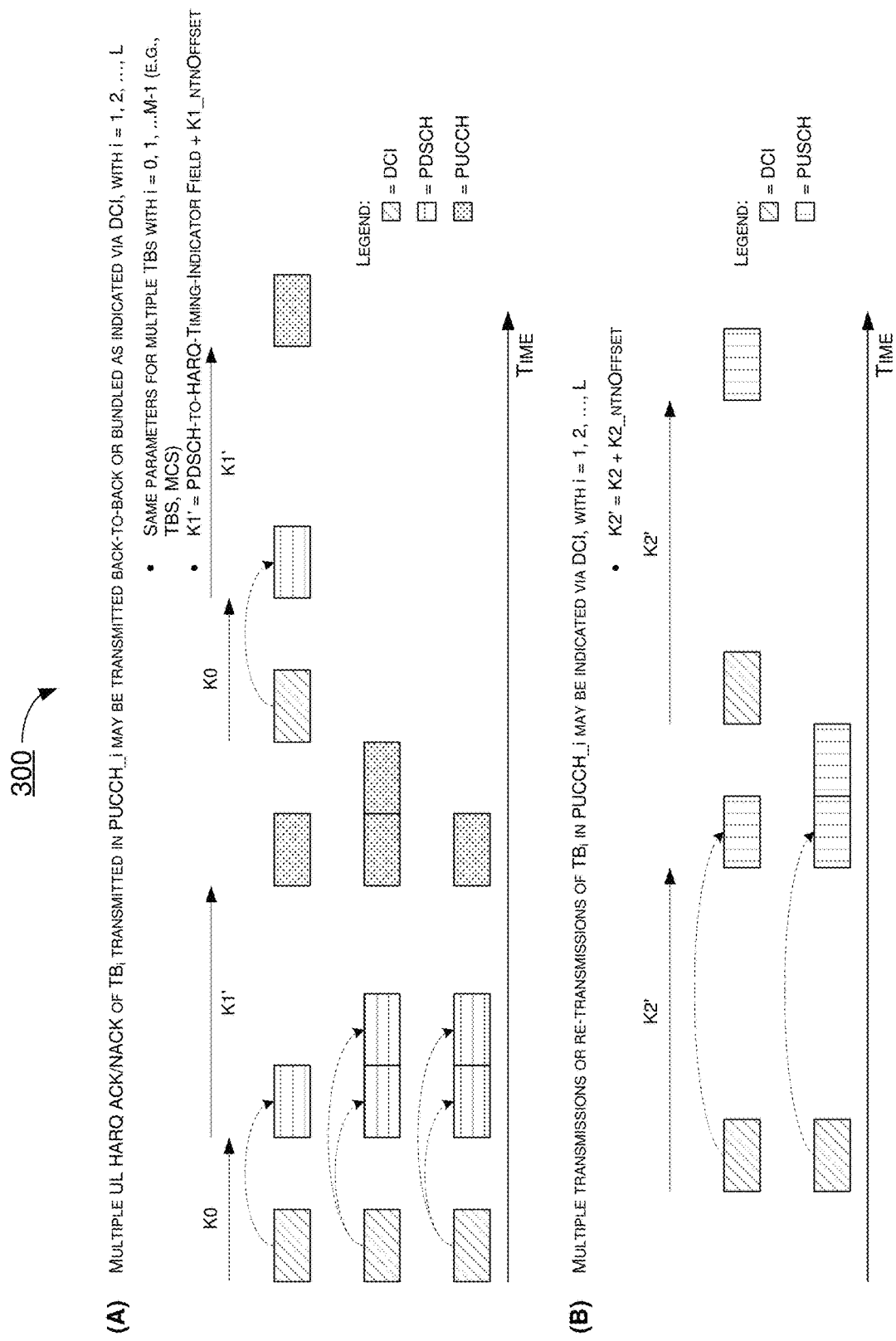
FIG. 3 is a diagram of an example scenario in accordance with the present disclosure.

FIG. 3 illustrates an example scenario 300 in accordance with a second proposed scheme of the present disclosure. Under the second proposed scheme, scheduling may be performed with NTN offset of multiple DL assignments or multiple UL grants via DCI. Referring to part (A) of FIG. 3, under the second proposed scheme and to address aforementioned Issue 1, multiple UL HARQ ACKs and/or NACKs of an $i^{th}$ transport block ($TB_i$) transmitted in PUCCH_i may be transmitted back-to-back or bundled as indicated via DCI, where i=1, 2, . . . , L with L denoting a length of consecutive symbols of UL data to be transmitted in PUSCH. For instance, multiple TBs may have the same parameters such as transport block size (TBS), modulation and coding scheme (MCS) and so on. Under the second proposed scheme, K1'=PDSCH-to-HARQ-timing-indicator field+K1_ntnOffset. Referring to part (B) of FIG. 3, under the second proposed scheme and to address aforementioned Issue 2, multiple transmissions and/or re-transmissions of $TB_i$ may be performed in PUSCH_i indicated via DCI, where i=1, 2, . . . , L. Here, K2'=K2+K2_ntnOffset.

Compared to existing approaches, the second proposed scheme may have a smaller average RTT with scheduling of multiple TBs compared to that of the first proposed scheme. Smaller scheduling delay may allow higher data rates without increasing the number of HARQ processes. Advantageously, increased efficiency may result as more bits may be transmitted per bandwidth resource within a scheduling time interval.

Illustrative Implementations

Figure 4:
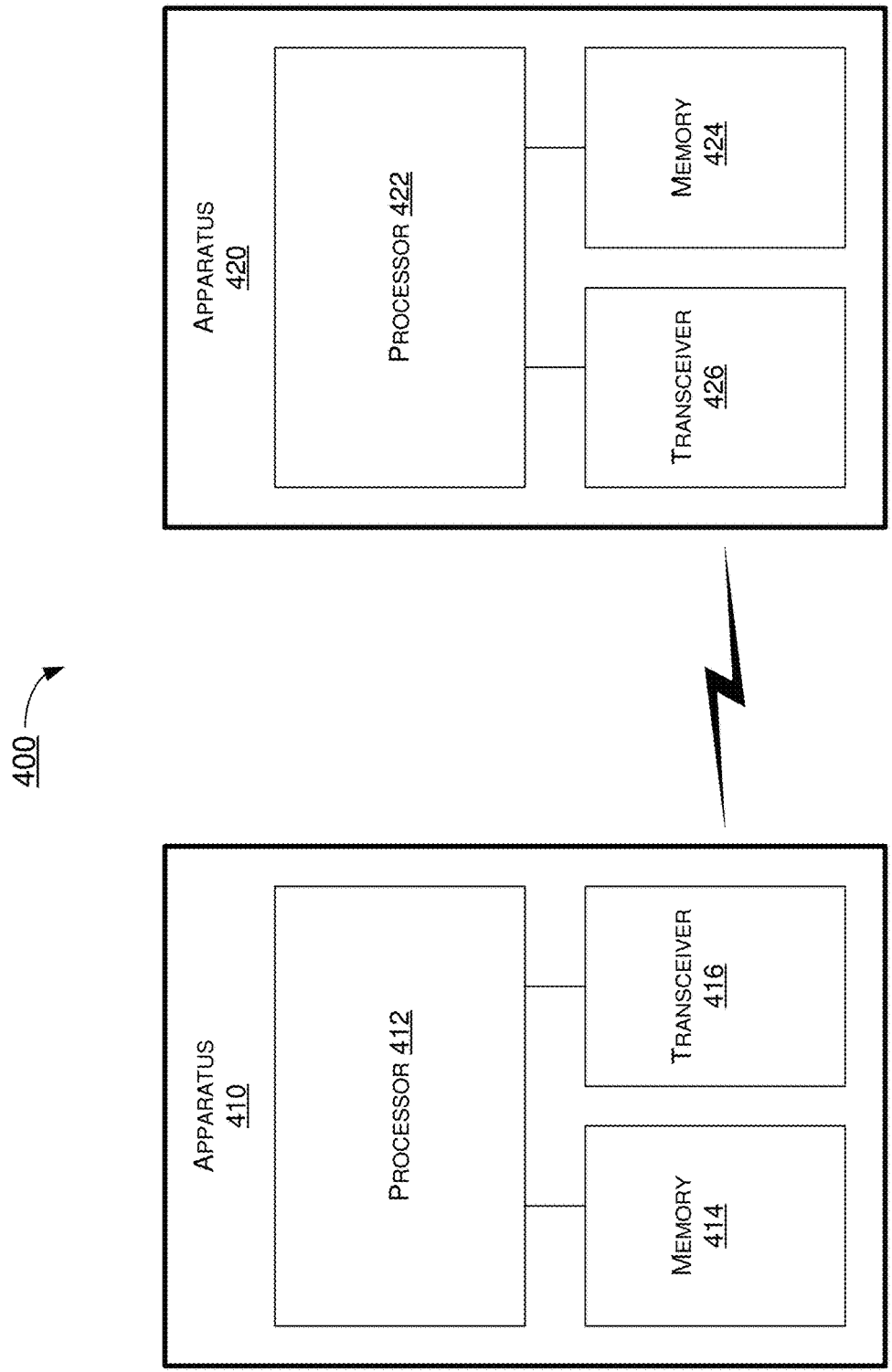
FIG. 4 is a block diagram of an example communication apparatus and an example network apparatus in accordance with an implementation of the present disclosure.

FIG. 4 illustrates an example communication environment 400 having an example apparatus 410 and an example apparatus 420 in accordance with an implementation of the present disclosure. Each of apparatus 410 and apparatus 420 may perform various functions to implement schemes, techniques, processes and methods described herein pertaining to UE-group WUS in NB-IoT, including various schemes described above as well as processes 500 and 600 described below.

Each of apparatus 410 and apparatus 420 may be a part of an electronic apparatus, which may be a UE such as a portable or mobile apparatus, a wearable apparatus, a wireless communication apparatus or a computing apparatus. For instance, each of apparatus 410 and apparatus 420 may be implemented in a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a network node or base station (e.g., eNB, gNB or transmit/receive point (TRP)), a small cell, a router or a gateway. For instance, at least one of apparatus 410 and apparatus 420 may be implemented in an eNodeB in an LTE, LTE-Advanced or LTE-Advanced Pro network or in a gNB in a 5G, NR, IoT or NB-IoT network. Alternatively, at least one of apparatus 410 and apparatus 420 may be implemented in the form of one or more IC chips such as, for example and without limitation, one or more single-core processors, one or more multi-core processors, or one or more CISC processors.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including UE-group WUS in NB-IoT in accordance with various implementations of the present disclosure.

In some implementations, apparatus 410 may also include a transceiver 416 coupled to processor 412 and capable of wirelessly transmitting and receiving data. In some implementations, apparatus 410 may further include a memory 414 coupled to processor 412 and capable of being accessed by processor 412 and storing data therein. In some implementations, apparatus 420 may also include a transceiver 426 coupled to processor 422 and capable of wirelessly transmitting and receiving data. In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of an NTN communication environment in which apparatus 410 is implemented in or as a wireless communication device, a communication apparatus or a UE and apparatus 420 is implemented in or as a network node (e.g., network node 120) connected or otherwise communicatively coupled to a network (e.g., network 125).

In one aspect of UL transmission timing for NTN in accordance with the present disclosure, processor 412 of apparatus 410 as UE 110 may receive, via transceiver 416, from apparatus 420 DCI indicating an NTN offset for a scheduling delay. Moreover, processor 412 may perform, via transceiver 416, one or more UL transmissions to satellite 130 with the scheduling delay which accounts for the NTN offset. In another aspect of UL transmission timing for NTN in accordance with the present disclosure, processor 422 of apparatus 420 as network node 120 may adjust, set or otherwise configure the NTN offset for the scheduling delay. Furthermore, processor 422 may transmit, via transceiver 426, to apparatus 410 as UE 110 the DCI indicating the NTN offset, such that apparatus 410 performs one or more UL transmissions to satellite 130 with the scheduling delay which accounts for the NTN offset.

In some implementations, the NTN offset may pertain to (e.g., to be used for) one or more DL assignments or one or more UL grants.

In some implementations, the NTN offset may be indicated in a system information block (SIB).

In some implementations, the DCI may be received at a slot n. In such cases, the DCI may indicate a plurality of PUCCH resources corresponding to a plurality of UL HARQ ACK and NACK of a plurality of transport blocks (TBs) at a slot n+K1', with K1' denoting the scheduling delay. In some implementations, K1'=K1+K1_ntnOffset. Here K1 may denote a parameter of scheduling offset for HARQ ACK and NACK, and K1_ntnOffset may denote the NTN offset indicated in the DCI. In some implementations, K1 may be indicated in a PDSCH-to-HARQ-timing indicator field in the DCI.

In some implementations, the DCI may be received at a slot n. In such cases, the DCI may indicate a plurality of PUSCH resources at a slot n+K2', with K2' denoting the scheduling delay. In some implementations, K2'=K2+K2_ntnOffset. Here, K2 may denote a parameter of scheduling offset for PUSCH, K2 may be based on a numerology of a PUSCH, and K2_ntnOffset may denote the NTN offset indicated in the DCI.

In some implementations, the DCI may be received at a slot n. In such cases, the DCI may indicate the scheduling delay in slots as n+K1', with K1' denoting the scheduling delay for HARQ ACK and NACK.

In some implementations, the DCI may be received at a slot n. In such cases, the DCI may indicate the scheduling delay in slots as $\{\lfloor n \cdot 2^{(\mu\_PUSCH-\mu\_PDCCH)} \rfloor + K2'\}$. Here, $\mu\_PUSCH$ may denote a numerology of a PUSCH, $\mu\_PDCCH$ may denote a numerology of a PDCCH, and K2' may denote the scheduling delay for UL data transmissions.

Illustrative Processes

Figure 5:
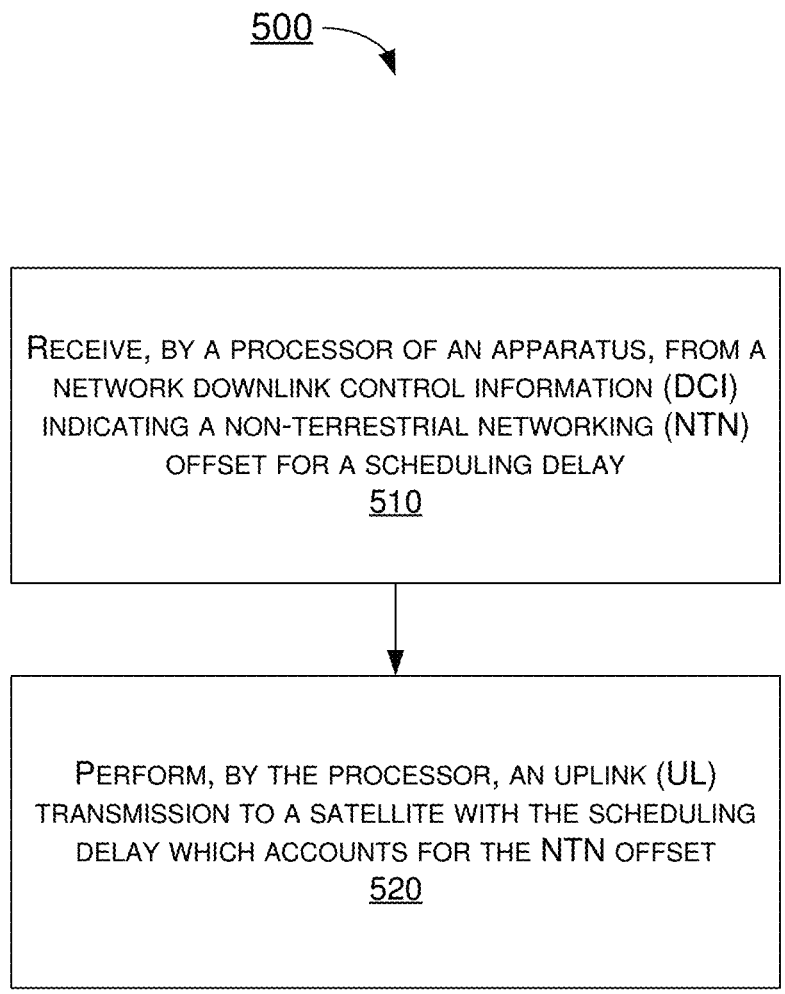
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to UE-group WUS in NB-IoT in accordance with the present disclosure. Process 500 may represent an aspect of implementation of features of apparatus 410 and apparatus 420. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 410, apparatus 420 and/or any suitable wireless communication device, UE, base station or machine type devices. Solely for illustrative purposes and without limitation, process 500 is described below in the context of apparatus 410 as a UE (e.g., UE 110) and apparatus 420 as a network node (e.g., network node 120) of a network (e.g., network 125). Process 500 may begin at block 510.

At 510, process 500 may involve processor 412 of apparatus 410 as a UE receiving, via transceiver 416, from apparatus 420 DCI indicating an NTN offset for a scheduling delay. Process 500 may proceed from 510 to 520.

At 520, process 500 may involve processor 412 performing, via transceiver 416, one or more UL transmissions to satellite 130 with the scheduling delay which accounts for the NTN offset.

In some implementations, the NTN offset may pertain to (e.g., to be used for) one or more DL assignments or one or more UL grants.

In some implementations, the NTN offset may be indicated in a SIB.

In some implementations, the DCI may be received at a slot n. In such cases, the DCI may indicate a plurality of PUCCH resources corresponding to a plurality of UL HARQ ACK and NACK of a plurality of TBs at a slot n+K1', with K1' denoting the scheduling delay. In some implementations, K1'=K1+K1_ntnOffset. Here K1 may denote a parameter of scheduling offset for HARQ ACK and NACK, and K1_ntnOffset may denote the NTN offset indicated in the DCI. In some implementations, K1 may be indicated in a PDSCH-to-HARQ-timing indicator field in the DCI.

In some implementations, the DCI may be received at a slot n. In such cases, the DCI may indicate a plurality of PUSCH resources at a slot n+K2', with K2' denoting the scheduling delay. In some implementations, K2'=K2+ K2_ntnOffset. Here, K2 may denote a parameter of scheduling offset for PUSCH, K2 may be based on a numerology of a PUSCH, and K2_ntnOffset may denote the NTN offset indicated in the DCI.

In some implementations, the DCI may be received at a slot n. In such cases, the DCI may indicate the scheduling delay in slots as n+K1', with K1' denoting the scheduling delay for HARQ ACK and NACK.

In some implementations, the DCI may be received at a slot n. In such cases, the DCI may indicate the scheduling delay in slots as $\{\lfloor n \cdot 2^{(\mu\_PUSCH-\mu\_PDCCH)} \rfloor + K2'\}$. Here, $\mu\_PUSCH$ may denote a numerology of a PUSCH, $\mu\_PDCCH$ may denote a numerology of a PDCCH, and K2' may denote the scheduling delay for UL data transmissions.

Figure 6:
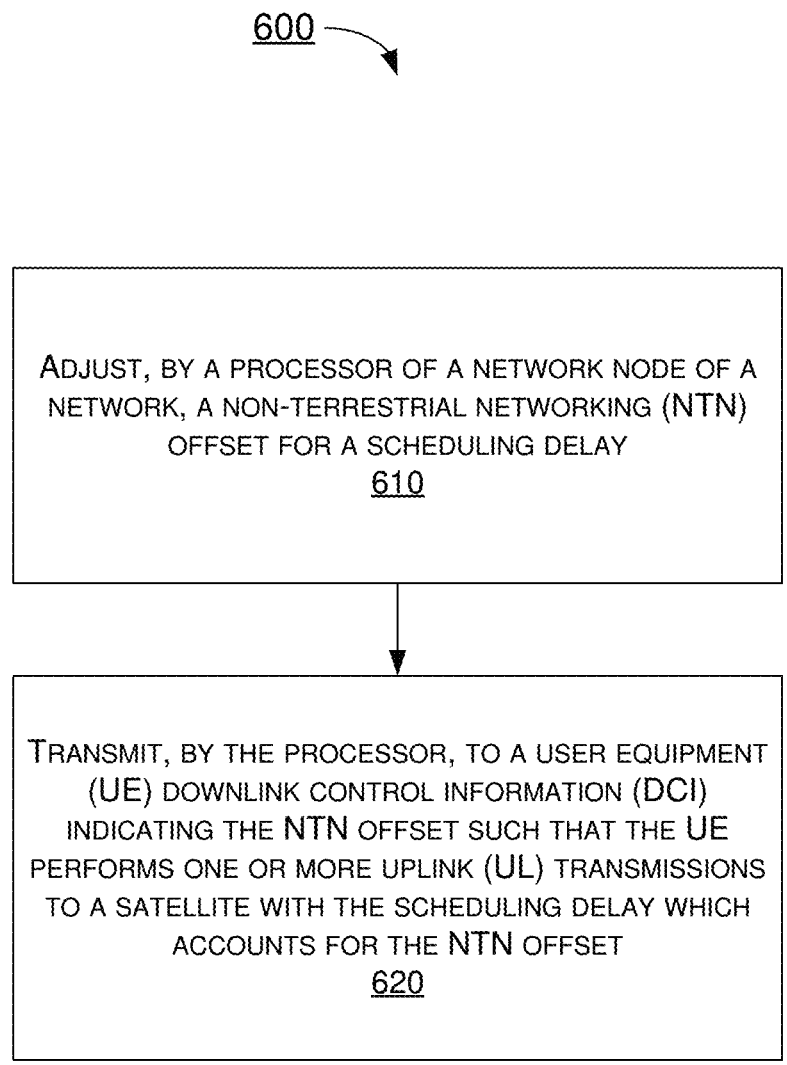
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to UE-group WUS in NB-IoT in accordance with the present disclosure. Process 600 may represent an aspect of implementation of features of apparatus 410 and apparatus 420. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may also be repeated partially or entirely. Process 600 may be implemented by apparatus 410, apparatus 420 and/or any suitable wireless communication device, UE, base station or machine type devices. Solely for illustrative purposes and without limitation, process 600 is described below in the context of apparatus 410 as a UE (e.g., UE 110) and apparatus 420 as a network node (e.g., network node 120) of a network (e.g., network 125). Process 600 may begin at block 610.

At 610, process 600 may involve processor 422 of apparatus 420, as a network node, adjusting, setting or otherwise configuring an NTN offset for a scheduling delay. Process 600 may proceed from 610 to 620.

At 620, process 600 may involve processor 422 transmitting, via transceiver 426, to apparatus 410 as a UE (e.g., UE 110) DCI indicating the NTN offset, such that apparatus 410 performs one or more UL transmissions to satellite 130 with the scheduling delay which accounts for the NTN offset.

In some implementations, the NTN offset may pertain to (e.g., to be used for) one or more DL assignments or one or more UL grants.

In some implementations, the NTN offset may be indicated in a system information block (SIB).

In some implementations, the DCI may be transmitted at a slot n. In such cases, the DCI may indicate a plurality of PUCCH resources corresponding to a plurality of UL HARQ ACK and NACK of a plurality of transport blocks (TBs) at a slot n+K1', with K1' denoting the scheduling delay. In some implementations, K1'=K1+K1_ntnOffset. Here K1 may denote a parameter of scheduling offset for HARQ ACK and NACK, and K1_ntnOffset may denote the NTN offset indicated in the DCI. In some implementations, K1 may be indicated in a PDSCH-to-HARQ-timing indicator field in the DCI.

In some implementations, the DCI may be transmitted at a slot n. In such cases, the DCI may indicate a plurality of PUSCH resources at a slot n+K2', with K2' denoting the scheduling delay. In some implementations, K2'=K2+ K2_ntnOffset. Here, K2 may denote a parameter of scheduling offset for PUSCH, K2 may be based on a numerology of a PUSCH, and K2_ntnOffset may denote the NTN offset indicated in the DCI.

In some implementations, the DCI may be transmitted at a slot n. In such cases, the DCI may indicate the scheduling delay in slots as n+K1', with K1' denoting the scheduling delay for HARQ ACK and NACK.

In some implementations, the DCI may be transmitted at a slot n. In such cases, the DCI may indicate the scheduling delay in slots as $\{\lfloor n \cdot 2^{(\mu\_PUSCH-\mu\_PDCCH)} \rfloor + K2'\}$. Here, $\mu\_PUSCH$ may denote a numerology of a PUSCH, $\mu\_PDCCH$ may denote a numerology of a PDCCH, and K2' may denote the scheduling delay for UL data transmissions.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a system information block (SIB) indicating a non-terrestrial networking (NTN) offset for a propagation delay; and
   performing, by the processor, an uplink (UL) transmission to a satellite with consideration of the NTN offset,
   wherein the performing comprises:
      receiving a downlink control information (DCI) at a slot n; and
      determining a plurality of physical uplink control channel (PUCCH) resources corresponding to a plurality of UL hybrid automatic repeat request (HARQ) acknowledgement (ACK) and negative acknowledgement (NACK) of a plurality of transport blocks (TBs) at a slot n + K1',
   wherein K1' denotes the propagation delay,
   wherein K1'=K1 +K1 ntnOffset, wherein K1 denotes a parameter of scheduling offset for HARQ ACK and NACK indicated in the DCI, and
   wherein K1 ntnOffset denotes the NTN offset indicated in the SIB.

2. The method of claim 1, wherein the NTN offset pertains to one or more DL assignments or one or more UL grants.

3. The method of claim 1, wherein K1 is indicated in a physical downlink shared channel (PDSCH)-to-HARQ-timing indicator field in the DCI.

4. The method of claim 1, wherein the performing further comprises:
   determining a plurality of physical uplink shared channel (PUSCH) resources at a slot n +K2',
   wherein K2' comprises the propagation delay.

5. The method of claim 4, wherein K2'=K2 +K2_ntnOffset, wherein K2 denotes a parameter of scheduling offset for a PUSCH indicated in the DCI, wherein K2 is based on a numerology of the PUSCH, and wherein K2_ntnOffset denotes the NTN offset in the SIB.

6. The method of claim 1, wherein:
   the DCI indicates the propagation delay in slots as $\{\lfloor n \cdot 2^{(\mu\_PUSCH - \mu\_PDCCH)} \rfloor + K2'\}$,
   $\mu\_PUSCH$ denotes a numerology of a physical uplink shared channel (PUSCH),
   $\mu\_PDCCH$ denotes a numerology of a physical downlink control channel (PDCCH), and
   K2' denotes the propagation delay for UL data transmissions.

7. An apparatus, comprising:
   a communication device configured to wirelessly communicate with a network and a satellite;
   a processor coupled to the communication device and configured to perform operations comprising:
      receiving, via the communication device, a system information block (SIB) indicating a non-terrestrial networking (NTN) offset for a propagation delay; and
      performing, via the communication device, an uplink (UL) transmission to a satellite with consideration of the NTN offset,
   wherein, in performing the UL transmission, the processor is configured to perform operations comprising:
      receiving a downlink control information (DCI) at a slot n; and
      determining a plurality of physical uplink control channel (PUCCH) resources corresponding to a plurality of UL hybrid automatic repeat request (HARQ) acknowledgement (ACK) and negative acknowledgement (NACK) of a plurality of transport blocks (TBs) at a slot n + K1',
   wherein K1' denotes the propagation delay,
   wherein K1'=K1 +K1 ntnOffset, wherein K1 denotes a parameter of scheduling offset for HARQ ACK and NACK indicated in the DCI, and
   wherein K1 ntnOffset denotes the NTN offset indicated in the SIB.

8. The apparatus of claim 7, wherein the NTN offset pertains to one or more DL assignments or one or more UL grants.

9. The apparatus of claim 7, wherein K1 is indicated in a physical downlink shared channel (PDSCH)-to-HARQ-timing indicator field in the DCI.

10. The apparatus of claim 7, wherein, in performing the UL transmission, the processor is further configured to perform operations comprising:
    determining a plurality of physical uplink shared channel (PUSCH) resources at a slot n + K2',
    wherein K2' denotes the propagation delay.

11. The apparatus of claim 10, wherein K2'=K2 +K2_ntnOffset, wherein K2 denotes a parameter of scheduling offset for a PUSCH indicated in the DCI, wherein K2 is based on a numerology of the PUSCH, and wherein K2_ntnOffset denotes the NTN offset indicated in the SIB.

12. The apparatus of claim 7, wherein
the DCI indicates the propagation delay in slots as $\{[n \cdot 2^{(\mu\_PUSCH - \mu\_PDCCH)}] + K2'\}$,
μ_PUSCH denotes a numerology of a physical uplink shared channel (PUSCH),
μ_PDCCH denotes a numerology of a physical downlink control channel (PDCCH), and
K2' denotes the propagation delay for UL data transmissions.

* * * * *